(12) United States Patent
Seabrook

(10) Patent No.: US 6,427,523 B1
(45) Date of Patent: Aug. 6, 2002

(54) METHOD AND APPARATUS FOR DETECTING LEAKS IN VEHICLES

(75) Inventor: Norman Seabrook, Coquitlam (CA)

(73) Assignee: Sealtech Manufacturing Inc., Burnaby (CA)

( * ) Notice: Subject to any disclaimer, the term of this patent is extended or adjusted under 35 U.S.C. 154(b) by 0 days.

(21) Appl. No.: 09/401,776

(22) Filed: Sep. 22, 1999

(51) Int. Cl.[7] ............................................... G01M 3/04
(52) U.S. Cl. ........................... 73/40.7; 73/49.8; 73/49.2
(58) Field of Search ..................... 73/40, 49.2, 49.3, 73/49.8, 40.7

(56) References Cited

U.S. PATENT DOCUMENTS

| | | | | |
|---|---|---|---|---|
| 4,517,826 A | * | 5/1985 | Cole et al. ...................... | 73/40 |
| 4,635,469 A | * | 1/1987 | Modera et al. ................. | 73/40 |
| 5,128,881 A | * | 7/1992 | Saum et al. .................... | 73/40 |
| 5,219,115 A | * | 6/1993 | Conley et al. ................. | 73/46 |
| 5,315,952 A | * | 5/1994 | Jackson, Jr. .................. | 114/312 |
| 5,780,722 A | * | 7/1998 | Kovacs ....................... | 73/49.2 |

* cited by examiner

Primary Examiner—Hezron Wlliams
Assistant Examiner—Michael Cygan
(74) Attorney, Agent, or Firm—Oyen Wiggs Green & Mutala

(57) ABSTRACT

A method and apparatus for detecting leaks in hollow bodies can be used to detect leaks in recreational vehicles which have standard air vents in their roofs. The apparatus includes a cuff which can be attached to a standard air vent from inside the vehicle. A conduit connects the cuff to an air impeller. The impeller can draw air into the vehicle through the roof vent to increase air pressure within the vehicle. Soapy water or a similar substance is then applied to the outside of the vehicle. Leaks are evidenced by the presence of bubbles in the soapy water, and can then easily be located and repaired. The air impeller can be powered from standard AC power receptacles inside the recreational vehicle.

27 Claims, 5 Drawing Sheets

METHOD AND APPARATUS FOR DETECTING LEAKS IN VEHICLES

BACKGROUND OF THE INVENTION

1. Field of the Invention

This invention relates to methods and apparatus for detecting leaks in hollow bodies. The invention has particular application in detecting leaks in the bodies of recreational vehicles. The method includes increasing the air pressure inside the vehicle so that leaks can be located by applying a leak detecting substance, such as soapy water, to the outside of the vehicle, and watching for bubbles which are formed in the soapy water where a leak allows air to emerge.

2. Description of the Related Art

Recreational vehicles, such as campers and motor homes, are susceptible to water leakage. Water leakage can cause extensive damage to the vehicle, especially if it is permitted to continue for a long time. Water which has entered the vehicle through leaks can collect in spaces behind interior paneling, cabinets and the like. The water can rust, rot and otherwise harm the vehicle and its fittings.

Water leaks may be difficult to locate because water can migrate significant distances along the inside surfaces of a vehicle's shell before the water appears in a visible location. Most interior surfaces in a recreation vehicle are lined or covered with paneling so that it is not possible to easily look for leaks from the inside of the vehicle. Further, it is difficult to recreate the conditions that exist when a vehicle is traveling along a highway while attempting to find leaks. When a vehicle travels at speed certain portions of the vehicle's exterior experience higher than ambient air pressures. This causes a pressure differential between the vehicle's interior and exterior which can cause water to be driven into the vehicle. A hole may be large enough to cause a leak when a vehicle is traveling but may be too small to be noticeable from the outside of the vehicle.

It is known that leaks in a vehicle may be located by pressurizing the interior of the vehicle. A leak detecting substance such as a mixture of soap and water can then be applied to the exterior of the vehicle to locate leaks. For example, Canadian Patent Application No. 2,106,951 to Hubert provides a fan mounted to a portable frame which can be placed adjacent to a vehicle. A conduit carries air pressurized by the fan into the vehicle. The conduit passes through a pliable, substantially air impervious member. The air impervious member can be used in various ways to seal an opening through which the conduit enters the vehicle. For example, the conduit may enter the vehicle through a window in a door of the vehicle with the air impervious member inside the door. The outer edge of the impervious member may then be placed between the door and the door frame and held in place by closing the door. The interior of the vehicle can then be pressurized by supplying air through the conduit. The Hubert device can be difficult and time consuming to attach properly and the impervious member is prone to becoming damaged.

After the interior of the vehicle is pressurized air flows outwardly through any faults in the outer shell of the vehicle. Soapy water or another leak detecting fluid can then be applied on the exterior surface of the vehicle. The presence of a leak is indicated by the formation of bubbles in the soapy water.

Schlumbaum, U.S. Pat. No. 3,580,054 discloses apparatus for testing for the presence of leaks in vehicles. The apparatus comprises a portable motor driven suction device which can be placed near a vehicle to be tested. The suction device has a flexible conduit which can be connected to the interior of a vehicle. The suction device can then be turned on. A pressure gauge measures pressure in the interior of the vehicle. If there are leaks in the vehicle then the suction device will be incapable of reducing the pressure inside the vehicle as much as would otherwise be possible. The Schlumbaum device can detect whether or not a vehicle has leaks but is not useful for locating such leaks.

There is a need for an effective leak detecting system which can be quickly and reliably attached to different vehicles.

SUMMARY OF THE INVENTION

The invention provides a leak detection method and apparatus. The apparatus comprises an air impeller which can be placed inside a vehicle to draw air into the vehicle. A duct connects the air impeller to an opening in the vehicle, such as a roof vent. One end of the duct has a cuff which seals to a roof vent or other suitable opening. The air pressure inside the vehicle can be raised by drawing air into the vehicle with the impeller. Preferred embodiments of the invention take advantage of the fact that many recreational vehicles have roof vents which are a standard size. This permits the impeller to be readily connected to the roof vent from inside the vehicle. The impeller can then draw air into the interior of the vehicle through the roof vent. Preferred embodiments of the invention provide a cuff which can be attached to the roof vent from inside the vehicle and then attached to the impeller with a flexible conduit. With the conduit detached from the cuff, a person can reach through the cuff to attach the cuff to the roof vent. The cuff may be attached to the roof vent with attachment members which include wide hooks. The hooks can be hooked over the edge of the rim that surrounds standard roof vents as are used on most recreational vehicles sold in North America. The attachment members can then be tightened to secure the cuff against the roof vent.

Another aspect of the invention provides a method of locating leaks in a vehicle having an interior, an exterior surface, and an opening, such as a roof vent. The method comprises: placing an air impeller in the vehicle interior and connecting an inlet of the air impeller to the opening in a substantially air tight manner; closing doors and windows of the vehicle; and, operating the air impeller to draw air into the vehicle interior, thereby raising an air pressure in the vehicle interior to permit leaks to be detected by applying a leak detecting fluid to the exterior surface of the vehicle. Operating the impeller preferably comprises plugging the impeller into an alternating current power outlet built into the vehicle. This avoids the need to have any power cords feed into the vehicle through partially open doors or windows. Preferably the air impeller comprises a variable speed motor and operating the air impeller comprises adjusting a speed of the motor to achieve an air pressure differential in the range of 0.3 inches of water and 1.0 inches of water between the interior of the vehicle and the exterior of the vehicle. Leaks can be detected by applying a soap—water mixture to the exterior of the vehicle and watching for the formation of bubbles. Preferably the opening comprises a square roof vent having a rim on at least two sides and connecting the inlet of the air impeller to the opening comprises attaching a cuff to the opening and connecting the cuff to the air impeller. Attaching the cuff to the opening comprises providing at least one attachment member on the cuff, hooking at least one attachment member over the rim and reducing a length of the attachment member so as to draw the cuff against the opening.

Further advantages and aspects of the invention are set out below.

BRIEF DESCRIPTION OF THE DRAWINGS

In drawings which illustrate specific embodiments of the invention, but which should not be construed as restricting the spirit or scope of the invention in any way.

Figure 1:
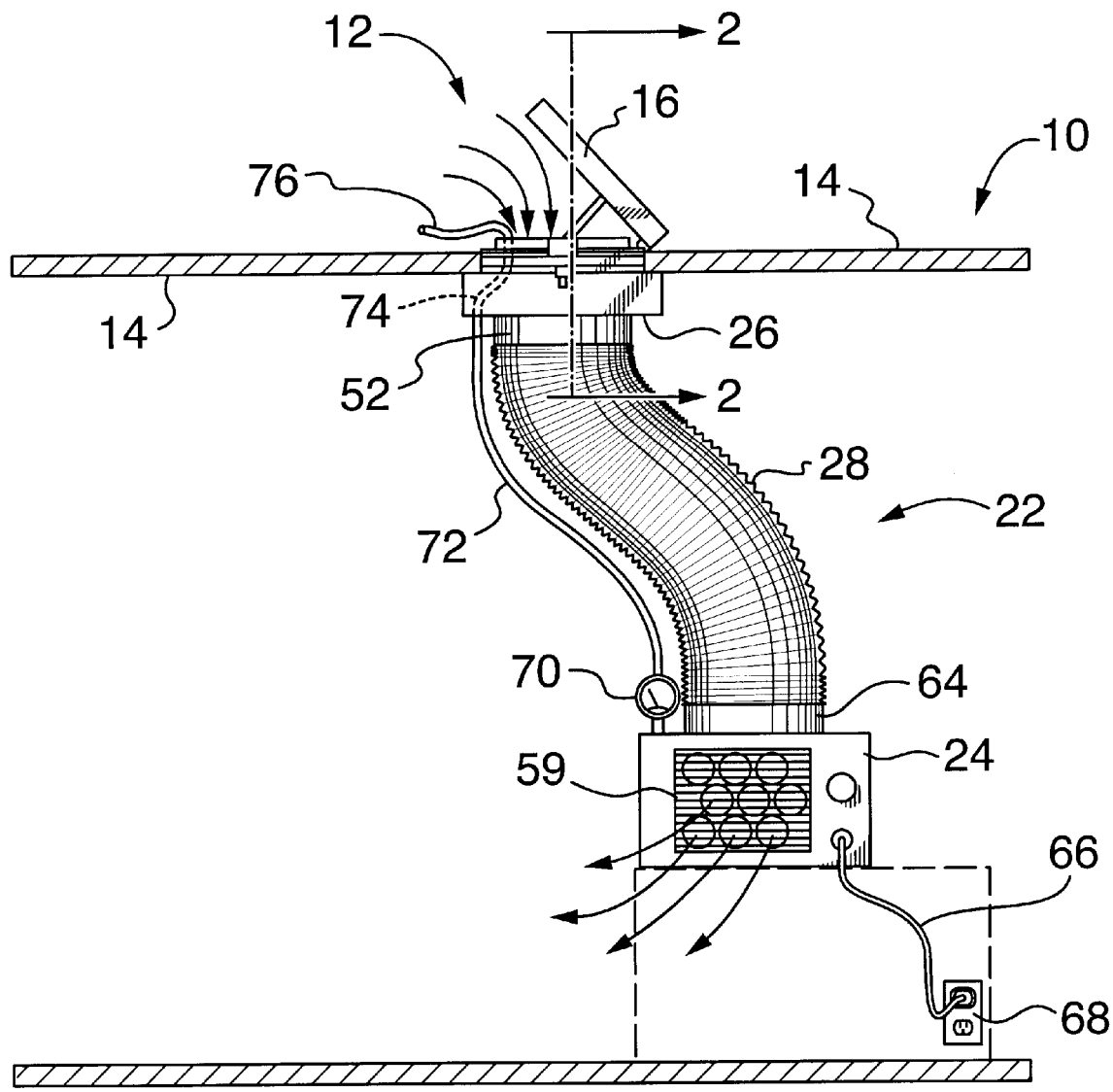
FIG. 1 is a partial longitudinal section through a recreational vehicle showing a leak detection apparatus embodying the invention.

List of Reference Numerals Used in the Drawings 10 recreational vehicle
12 air vent
14 roof of recreational vehicle
15 opening in air vent
16 vent cover
18 crank (for opening or closing vent cover)
20 rim
22 apparatus
24 impeller unit
26 cuff
28 conduit
30 attachment members
32 hooks
34 hooks
36 holes
38 cross member
40 top portion of cuff 26
42 edge of cuff 26
44 sealing material
46 aperture in lower portion of cuff 26
47 chains
47A snap links
48 lower portion of cuff 26
50 L-shaped slots
52 ring (on conduit 28)
54 pins
56 impeller housing
58 impeller
59 vents
60 impeller motor
61 motor speed control
62 connector (on impeller unit 24)
64 ring (on conduit 28)
66 power cord
68 electrical socket
70 pressure gauge
72 tube
74 through fitting
76 tube
79 walls of bridge
80 bridge
82 bridge end members

DETAILED DESCRIPTION

The preferred embodiments of this invention take advantage of the fact that many recreational vehicles incorporate roof vents having standard sizes. FIG. 1 shows a portion of a typical recreational vehicle 10 which has a standard sized square air vent 12 located in its roof 14. Air vent 12 is typically dimensioned to fit into a hole 14 inches square in roof 14. Air vent 12 has an opening 15 which is most typically 12 inches square. A screen (not shown) is usually provided in the opening 15 to keep flying insects from entering vehicle 10. Such screens are almost always readily removable from inside vehicle 10.

Vent 14 has a tilting cover 16 for covering opening 15. Cover 16 can typically be opened or closed by turning a crank 18. Cover 16 swings upwardly when it is opened. Air vent 12 generally has an upwardly projecting rim 20 When cover 16 is closed it rests against rim 20, which is typically coated with a rubber layer to provide a seal. It would be awkward to attach to vent 12 apparatus for forcing air into vent 12 from outside of vehicle 10 (as is shown by Hubert in Canadian patent application No. 2,106,951) because cover 16 opens outwardly. The Hubert device would also require an operator to climb onto the roof of a recreational vehicle to attach apparatus for forcing air into vent 12. This would place the operator at risk and also risk damaging the roof of the recreational vehicle.

Figure 2:
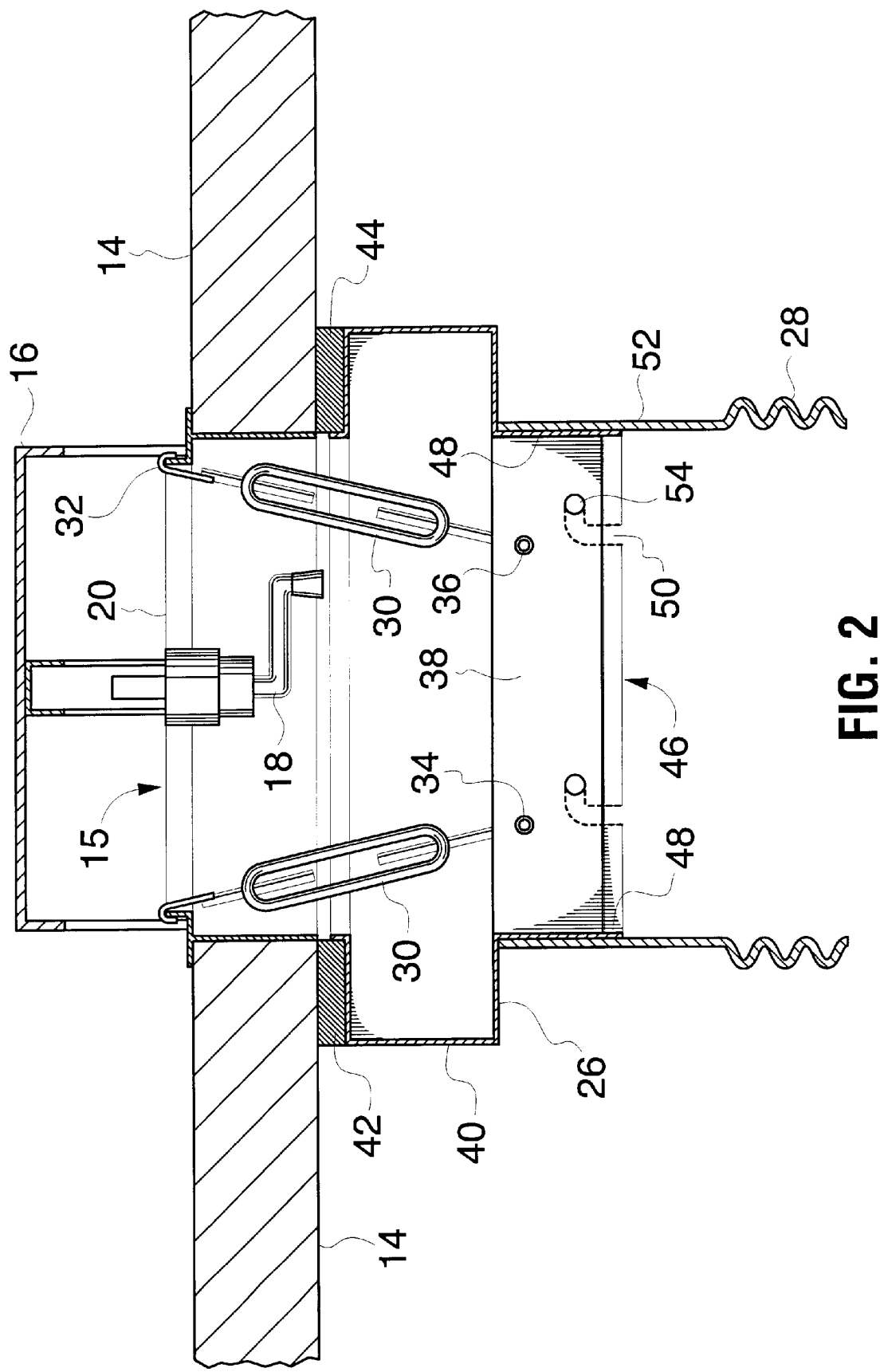
FIG. 2 is a section through the upper cuff portion of the apparatus attached to a vent in the recreational vehicle as indicated by the section line 2—2 of FIG. 1.

Apparatus 22 attaches to the inside of a suitable opening, such as an air vent 12 as shown best in FIG. 2. Apparatus 22 comprises an impeller unit 24 which draws air into vehicle 10. In the preferred embodiment of the invention, apparatus 22 comprises a cuff 26 adapted to attach to and seal against vent 12 and a reinforced conduit 28 which connects cuff 26 to impeller unit 24. Conduit 28 is fashioned of an airtight flexible material which is reinforced sufficiently so that it does not collapse in use. Conduit 28 is preferably of an "accordion" style to allow for easy storage and flexible length and shape. Conduit 28 may comprise, for example, cotton impregnated with neoprene rubber and reinforced with a wire helix. Conduit 28 has sufficient diameter to permit air to easily flow into vehicle 10. It has been found that a conduit 28 14 inches in diameter provides good results. When impeller unit 24 is operating the interior of vehicle 10 may be pressurized by closing all openings such as windows and doors which would permit air to escape from vehicle 10. If there are large holes where air can leak out of vehicle 10 then such holes should be plugged, for example with a damp rag. It will likely not be possible, nor is it necessary, to make vehicle 10 completely airtight. Cover 16 of air vent 12 should be open.

Impeller unit 24 may be coupled to vent 12 as shown in FIGS. 1 and 2. In the illustrated embodiment, a ceiling vent to conduit adapter or "cuff" 26 is attached to vent 12 with attachment members 30. Members 30 are adapted to be secured to rim 20 of vent 12. Attachment members 30, preferably comprise turnbuckles or other tightening means which permit cuff 26 to be drawn upwardly until it seals around the periphery of vent 12.

Preferably, each attachment member 30 has a wide upper hook 32. Hooks 32 can be hooked over rim 20 as shown. Hooks 32 should have a significant width so that they do not apply enough pressure to damage rim 20. Preferably two diametrically opposed attachment members 30 are used to secure cuff 26 to vent 12. In the illustrated embodiment, each attachment member 30 has a lower hook 34 which can engage an aperture 36 on a cross member 38 in cuff 26.

As best seen in FIG. 2, cuff 26 has a top portion 40 having an upper edge 42 shaped to fit around vent 12 and faced with a sealing material 44. Sealing material 44 is preferably a non-scratching durable compliant material such as a closed cell foam. When attachment members 30 are tightened then cuff 26 is drawn against vent 12 and sealing material 44 seals against vent 12 and/or portions of roof 14 surrounding vent 12.

To secure cuff 26 to vent 12, the screen (if present) is removed from opening 15. In some cases it may be necessary to remove some trim around vent 12 and/or to remove crank 18 in order to remove the screen. Upper hooks 32 are then hooked over rim 20 on either side of opening 15. Then cuff 26 is placed against vent 12 and the lower hook 34 of each attachment member 30 is secured in one of apertures 36. This can be done by reaching up through the aperture 48 at the bottom of cuff 26. The operator can then reach through cuff 26 and tighten attachment members 30 so that cuff 26 is secured around vent 12 in a sufficiently air tight manner. The ease with which cuff 26 may be affixed to vent 12 from inside vehicle 10 provides significant advantages over those prior systems which require an operator to stand on the roof of a vehicle 10 in order to affix an attachment to the outside of the roof vent.

Figure 3:
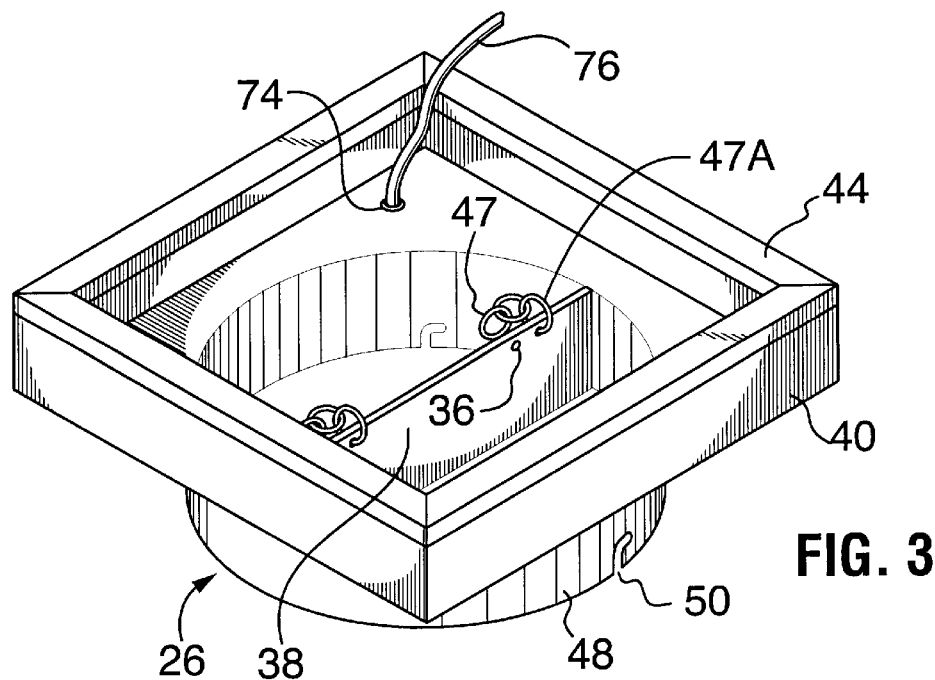
FIG. 3 is an isometric view of the upper cuff portion.
Figure 4:
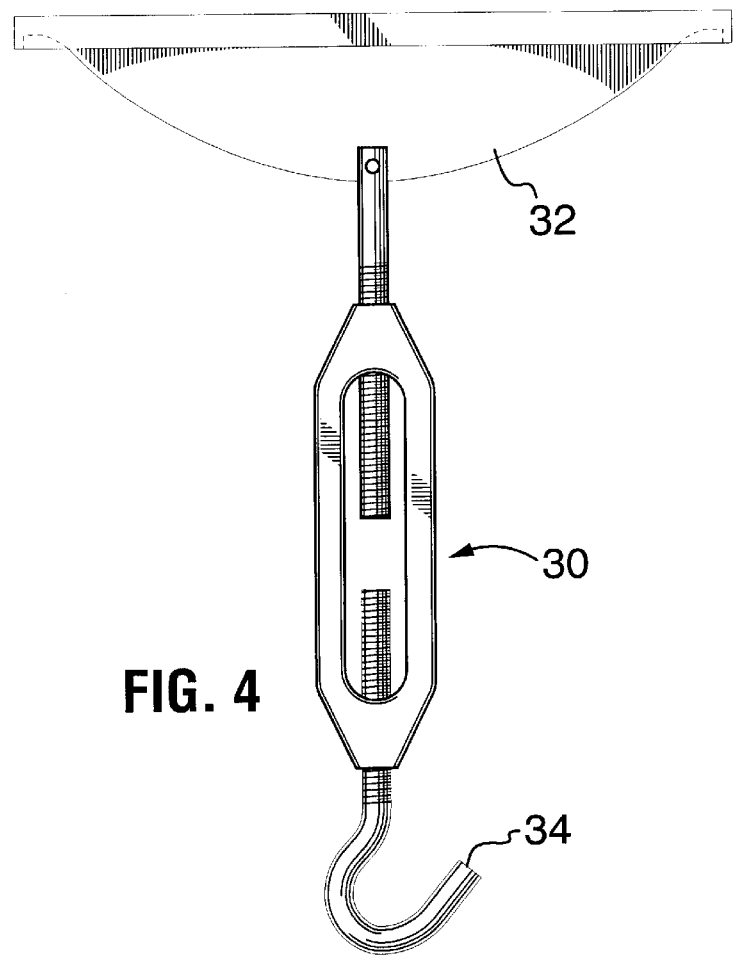
FIG. 4 is a plan view of a turnbuckle used to attach the upper cuff to a roof vent.
Figure 5:
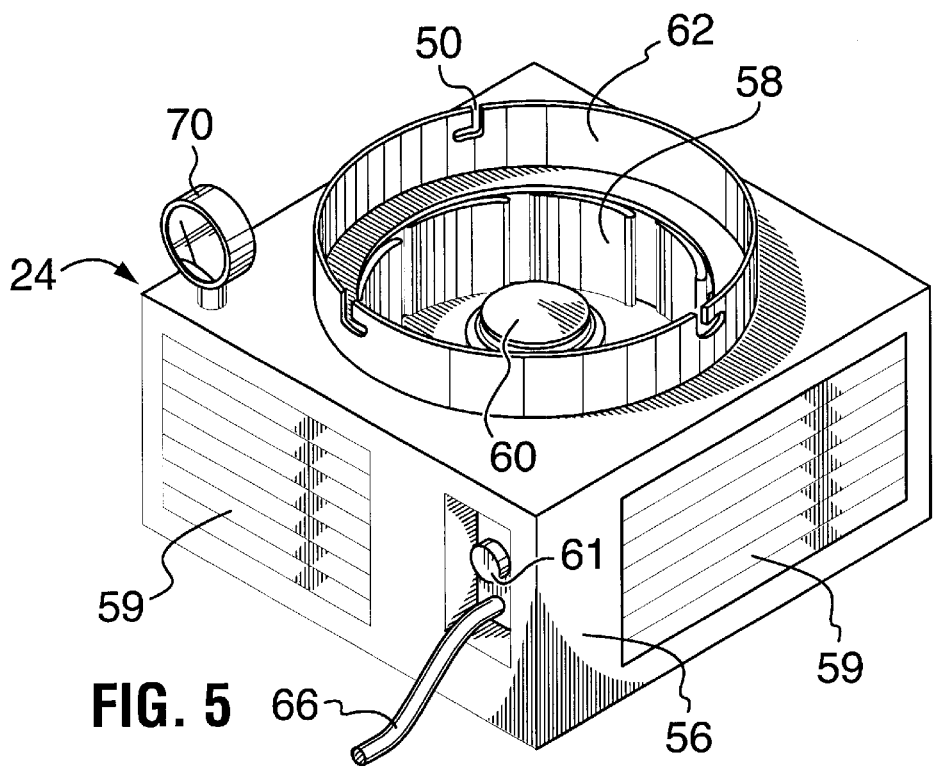
FIG. 5 is an isometric view of the impeller thereof.
Figure 6:
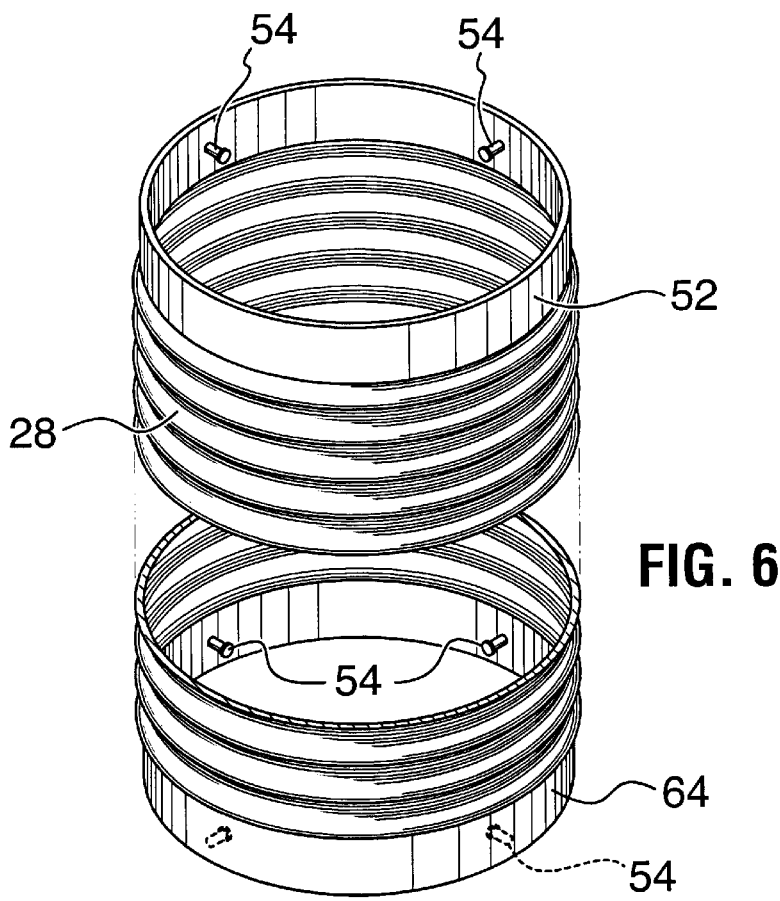
FIG. 6 is an isometric view of the conduit thereof.

Some recreational vehicles have much thicker roofs than others. If roof 14 is very thick then lower hooks 34 might not reach holes 36. In this case an extender is needed. In the embodiment of FIG. 3, pieces of chain 47 are attached to cross member 38. Chain pieces 47 are preferably detachable from cross member 38. For example, chains 47 may be connected to cross member 38 by snap links 47A. If hooks 34 cannot reach holes 36 then they can be hooked into a link of one of chains 47.

Cuff 26 has a lower portion 48 to which conduit 28 may be detachably affixed. In the illustrated embodiment, lower portion 48 is cylindrical and has L-shaped slots 50 spaced around its lower edge. Conduit 28 has a ring 52 which is dimensioned to fit snugly around lower portion 48 of cuff 26. Pins 54 project radially inwardly from ring 52. Conduit 28 can be attached to cuff 26 by sliding ring 52 over lower portion 48 until pins 54 engage in slots 50 and then rotating ring 52 to fully engage pins 54 in slots 50 so that ring 52 is removably affixed to cuff 26.

Impeller unit 24 comprises a suitable housing 56 containing an impeller 58 driven by a motor 60. Impeller 58 is of a type which can deliver a high volume of air at low pressure. Vents 59 in housing 56 deliver air from impeller 58 into the interior of vehicle 10. Impeller 58 is preferably also compact so that impeller unit 24 can be made small enough to be easily carried into a vehicle 10. Impeller unit 24 is preferably capable of delivering about 1500 to 2000 cubic feet of air per minute at zero static pressure differential at maximum output. It has been found that a backward curved AC impeller capable of delivering about 1850 cubic feet of air per minute at 0 static pressure differential and capable of delivering about 1500 cubic feet of air per minute through a static pressure differential of 0.6 inches of water column works well for leak testing a wide variety of recreational vehicles. Some such impellers are very compact, being less than 15 inches in diameter. Impeller 58 can preferably deliver in excess of 1500 cubic feet per minute against a pressure differential of 0.3 inches of water column and in excess of 1250 cubic feet per minute against a pressure differential of 1 inches of water column.

Impeller 58 is preferably incapable of developing sufficient air pressure within vehicle 10 to create any risk of structural damage to vehicle 10. Preferably impeller 58 is incapable of delivering any air flow against pressure differentials in excess of 1.7 inches of water column.

Motor 60 is preferably a variable speed motor. The pressure within vehicle 10 can then be adjusted to an optimum value by adjusting the speed of motor 60. A motor speed control 61 is provided on impeller unit 24 for this purpose.

Conduit 28 is most preferably detachable from impeller unit 24. In the illustrated embodiment, impeller 24 has a cylindrical connector 62 to which a ring 64 on conduit 28 can be detachably affixed. Connector 62 has several L-shaped slots 50 which receive pins 54 which project radially inwardly from ring 64. Ring 64 attaches to connector 62 in the same way that ring 52 attaches to lower portion 48.

Impeller unit 24 is preferably powered by standard AC power provided through a power cord 66. Power cord 66 can be plugged into a power socket 68 inside vehicle 10. Most recreational vehicles have interior power sockets 68 capable of providing electrical power to operate impeller unit 24. This is advantageous because it does not require any door or window of the vehicle to be left ajar to pass a power cord into vehicle 10. It also does not require feeding a power cord into vehicle 10 through opening 15 as would otherwise be necessary. Leaving a door or window ajar would likely prevent the development of the necessary pressure differential between the interior and the exterior of vehicle 10. Power sockets 68 are typically built into recreational vehicles and draw electrical current from an external supply delivered through a power cord (not shown) which delivers power to recreational vehicle 10 through a power receptacle (not shown) on the exterior of vehicle 10. In some cases, the electrical power at sockets 68 can also be provided by a power generator in recreational vehicle 10.

A differential pressure gauge 70 is preferably provided to indicate the difference in air pressure between the interior of vehicle 10 and the exterior of vehicle 10. Pressure gauge 70 may be mounted on impeller unit 24 for convenience. A tube 72 extends from pressure gauge 70 to an interior side of a bulkhead fitting 74 on cuff 26. Another tube 76 extends from an exterior side of bulkhead fitting 74 to a location on the exterior of vehicle 26 where it can sense the ambient exterior air pressure. The pressure in the interior of recreational vehicle 10 is sensed at differential pressure gauge 70.

When apparatus 22 has been assembled as described above and impeller 58 is turned on then air is drawn into vehicle 10 and the air pressure within vehicle 10 rises. Motor speed control 61 can be used to adjust the air pressure within vehicle 10 to a desired value. The difference in the air pressure between the outside and inside of vehicle 10 should be small enough so as not to damage vehicle 10. A pressure difference of less than about $\frac{1}{28}$ lb./square inch or less (1 inch of water column) is typically sufficient for leak detection purposes. The air pressure differential between the inside and outside of vehicle 10 is preferably maintained in the range of 0.3 to 1.0 inches of water column and is most preferably somewhere in the range of 0.3 inches of water column to 0.8 inches of water column.

While a desired pressure is maintained inside vehicle 10, the operator(s) can apply a plain soap/water mixture or another suitable leak detecting liquid to the exterior of vehicle 10. Where a soap water mixture is used it is preferable to use about 1 part of soap to 40 parts of water. The formation of bubbles in the soap/water mixture indicates air flow from a leak. This allows the leak to be easily located. The leak may then be mended.

The subject apparatus and method thus provide for a portable apparatus and method of detecting leaks. While most recreational vehicles have a standard size of roof vent 12, cuffs 26 may be provided to accommodate different sizes and/or shapes of vent.

As will be apparent to those skilled in the art in the light of the foregoing disclosure, many alterations and modifications are possible in the practice of the invention without departing from the spirit or scope thereof. For example, the particular manner in which cuff 26 is attached to vent 12 may be varied. All that is necessary is that there be some way to detachably attach cuff 26 to provide a seal around vent 12. It is highly preferable that conduit 28 be detachable from both cuff 26 and impeller unit 24. Having an easily detachable conduit makes apparatus 22 easier to move around and install. Conduit 28 could be permanently attached to impeller unit 24 and the apparatus could still be used. Conduit 28 could be permanently attached to cuff 26 and apparatus 22 could still be used if a hatch were provided to allow access to members 30 or if some means were provided to manipulate members 30 from outside of cuff 26.

Figure 7:
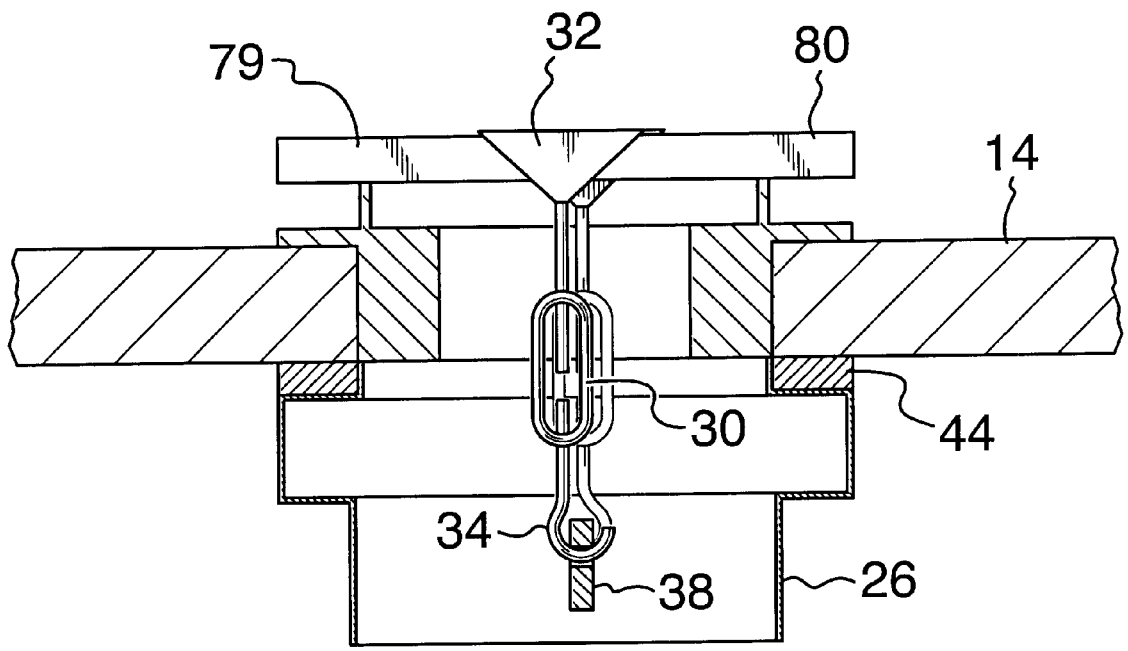
FIG. 7 illustrates the use of a bridge to attach a cuff to a roof vent.
Figure 8:
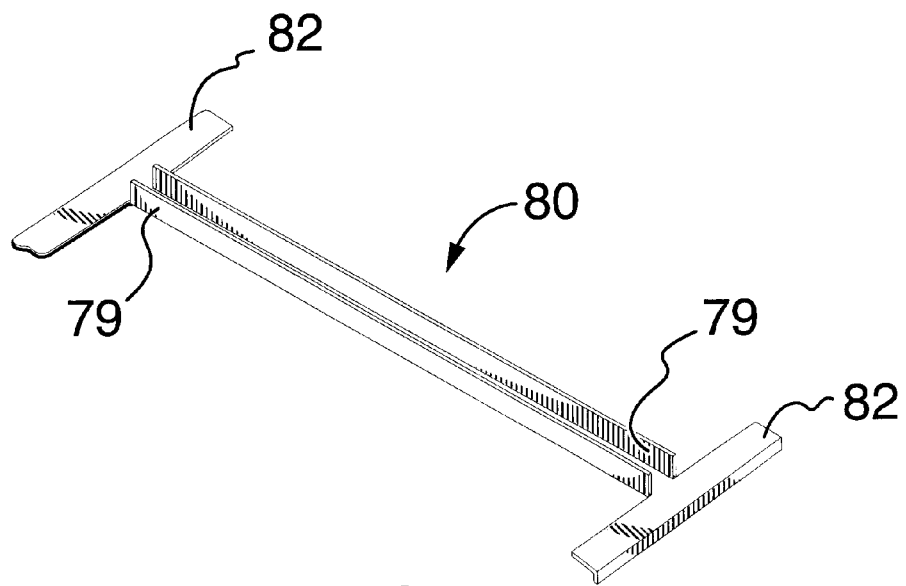
FIG. 8 illustrates a bridge which may be used with the invention.

One type of air vent, which is sold under the trademark FANTASTIC FAN VENT™, fits into a standard sized roof opening but provides a smaller through hole 15 than usual. Cuff 26 can still be used with such roof vents by bridging the roof vent with a flat-bottomed U-shaped bridge 80 and hooking hooks 32 over the edges of the upwardly extending walls 79 on either side of bridge 80, as shown in FIG. 7. Bridge 80 may have members 82 at either end. Members 82 distribute forces on bridge 80 along the sides of a vent 12.

While it is highly convenient for impeller unit 24 to be powered by standard AC electrical power provided through an electrical socket inside vehicle 10, other power sources could be used.

Accordingly, the scope of the invention is to be construed in accordance with the substance defined by the following claims.

What is claimed is:

1. Apparatus for pressurizing the interior of a vehicle, the apparatus comprising: a portable air impeller capable of being placed inside a vehicle the air impeller connectable to an opening in the vehicle in a substantially airtight manner whereby, when the air impeller is operated, air is drawn into the vehicle through the opening in sufficient quantity to raise an air pressure within the vehicle enough to detect leaks in the vehicle when a leak detecting fluid is applied to an exterior surface of the vehicle, wherein the opening is a standard roof vent and the apparatus is adapted for connection of the air impeller to the roof vent from the interior of the vehicle.

2. The apparatus of claim 1 wherein the cuff comprises a bulkhead fitting and the apparatus comprises a tube connected to an exterior side of the bullhead fitting and a differential pressure gauge connected to an interior side of the bulkhead fitting.

3. The apparatus of claim 1 wherein the impeller provides an air flow in the range of 1500 cubic feet per minute to about 2000 cubic feet per minute at zero static pressure differential.

4. The apparatus of claim 3 comprising a flexible conduit connecting the air impeller to the opening, the conduit providing a substantially airtight passageway from the opening to an air inlet of the impeller, the apparatus further comprising a cuff detachably affixable to an opening in a vehicle, the cuff comprising a housing having a sealing member capable of sealing around the opening, at least one attachment member adapted to hold the cuff in place with the sealing member around the opening and a connector for detachably affixing one end of a conduit to the cuff.

5. The apparatus of claim 4 wherein the attachment member is adapted to attach to a rim surrounding the opening on an outside of the vehicle.

6. The apparatus of claim 1 comprising a flexible conduit connecting the air impeller to the opening, the conduit providing a substantially airtight passageway from the opening to an air inlet of the impeller.

7. The apparatus of claim 6 wherein the conduit is detachable from the impeller.

8. The apparatus of claim 1 wherein the vehicle is a recreational vehicle having at least one internal built in alternating current power socket and the impeller is powered by alternating current provided through the internal alternating current power socket.

9. The apparatus of claim 1 wherein the opening is a standard roof vent having an opening about 12 inches square and the cuff sealing member is dimensioned to surround the opening.

10. The apparatus of claim 1 wherein the air impeller is adapted to increase an air pressure within the vehicle by an amount in the range of 0.3 inches of water column to 1 inch of water column.

11. Apparatus for pressurizing the, interior of a vehicle, the apparatus comprising:
    a portable air impeller capable of being placed inside a vehicle the air impeller connectable to an opening in the vehicle in a substantially airtight impeller whereby, when the air impeller is operated, air is drawn into the vehicle through the opening in sufficient quantity to raise an air pressure within the vehicle enough to detect leaks in the vehicle when a leak detecting fluid is applied to an exterior surface of the vehicle;
    a flexible conduit connecting the air impeller to the opening, the conduit providing a substantially airtight passageway from the opening to an air inlet of the impeller;
    a cuff detachably affixable to an opening in a vehicle, the cuff comprising a housing having a sealing member capable of sealing around the opening; and,
    at least one attachment member adapted to hold the cuff in place with the sealing member around the opening and a connector for detachably affixing one end of the conduit to the cuff, wherein the attachment member is adapted to attach to a rim surrounding the opening on an outside of the vehicle, the attachment member comprises a turnbuckle having a broad hook capable of being hooked over the rim, and the impeller provides an air flow in the range of 1500 cubic feet per minute to about 2000 cubic feet per minute at zero static pressure differential.

12. The apparatus of claim 11 wherein the air impeller is adapted to increase an air pressure within the vehicle by an amount in the range of 0.3 inches of water column to 1 inch of water column.

13. The apparatus of claim 11 wherein the conduit is detachable from the impeller.

14. The apparatus of claim 13 wherein the impeller is capable of delivering an air flow of at least 1500 cubic feet per minute against a pressure differential of 0.3 inches of water column, an air flow of at least 1250 cubic feet per minute against a pressure differential of 1 inches of water column and wherein the impeller is incapable of delivering any air flow against a pressure differential in excess of 1.7 inches of water column.

15. The apparatus of claim 11 wherein the vehicle is a recreational vehicle having at least one internal built in alternating current power socket and the impeller is powered by alternating current provided through the internal alternating current power socket.

16. The apparatus of claim 11 wherein the cuff comprises a cross member and the turnbuckle is attached at one end to the cross member.

17. The apparatus of claim 11 wherein the opening is a standard roof vent having an opening about 12 inches square and the cuff sealing member is dimensioned to surround the opening.

18. The apparatus of claim 11 wherein the cuff comprises a bulkhead fitting and the apparatus comprises a tube connected to an exterior side of the bulkhead fitting and a differential pressure gauge connected to an interior side of the bulkhead fitting.

19. A method of locating leaks in a vehicle having an interior, an exterior surface, and an opening, the method comprising:
 a) placing an air impeller in the vehicle interior and connecting an inlet of the air impeller to the opening in a substantially air tight manner;
 b) closing doors and windows of the vehicle; and,
 c) operating the air impeller to draw air into the vehicle interior, thereby raising an air pressure in the vehicle interior to permit leaks to be detected by applying a leak detecting fluid to the exterior surface of the vehicle.

20. The method of claim 19 wherein connecting an inlet of the air impeller to the opening comprises securing a first end of a conduit to the opening in a substantially airtight manner and securing a second end of the conduit to the impeller.

21. The method of claim 20 wherein operating the impeller comprises plugging the impeller into an alternating current power outlet built into the vehicle.

22. The method of claim 21 wherein the air impeller comprises a variable speed motor and operating the air impeller comprises adjusting a speed of the motor to achieve an air pressure differential in the range of 0.3 inches of water column to 1.0 inches of water column between the interior of the vehicle and the exterior of the vehicle.

23. The method of claim 22 comprising applying a soap—water mixture to the exterior of the vehicle.

24. The method of claim 19 wherein the opening comprises a square roof vent.

25. The method of claim 24 wherein the roof vent has a rim on at least two sides and connecting the inlet of the air impeller to the opening comprises attaching a cuff to the opening and connecting the cuff to the air impeller.

26. The method of claim 25 wherein attaching the cuff to the opening comprises providing at least one attachment member on the cuff, hooking at least one attachment member over the rim and reducing a length of the attachment member so as to draw the cuff against the opening.

27. The method of claim 26 comprising attaching the cuff to the opening from within the vehicle.

* * * * *